April 21, 1970 — A. V. VALENTE — 3,507,106
TREE CROP HARVESTER
Filed May 15, 1967 — 4 Sheets-Sheet 1
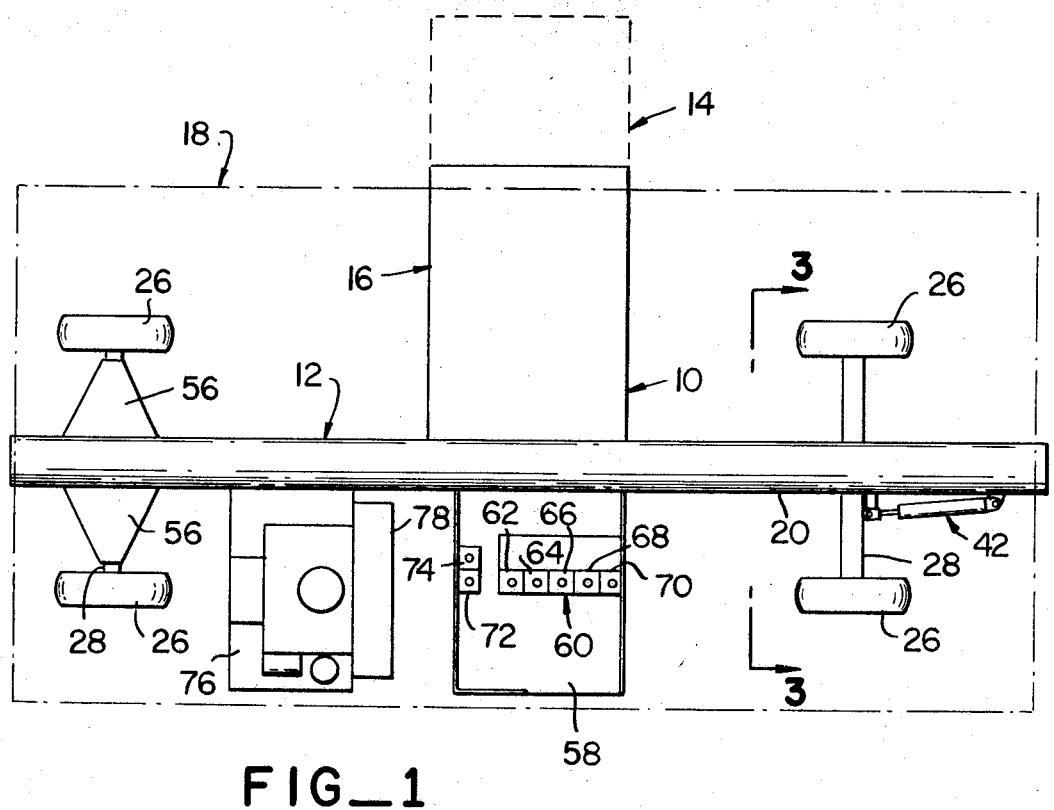
FIG_1
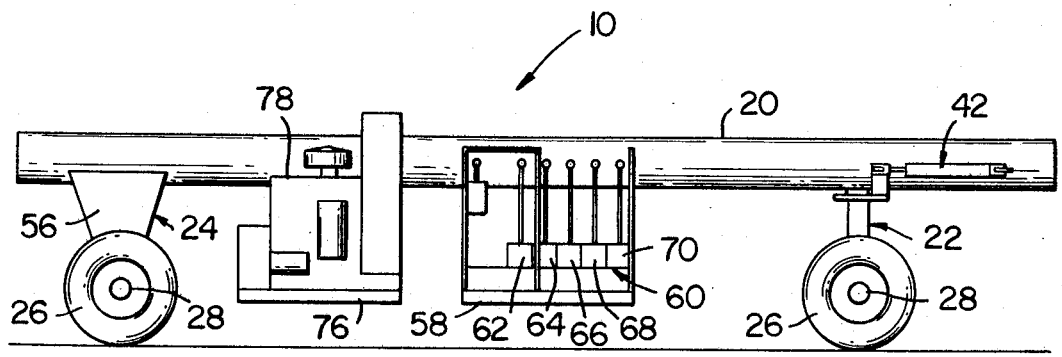
FIG_2
INVENTOR.
ALBERT V. VALENTE
BY
Townsend and Townsend
ATTORNEYS April 21, 1970  A. V. VALENTE  3,507,106
TREE CROP HARVESTER
Filed May 15, 1967  4 Sheets-Sheet 2
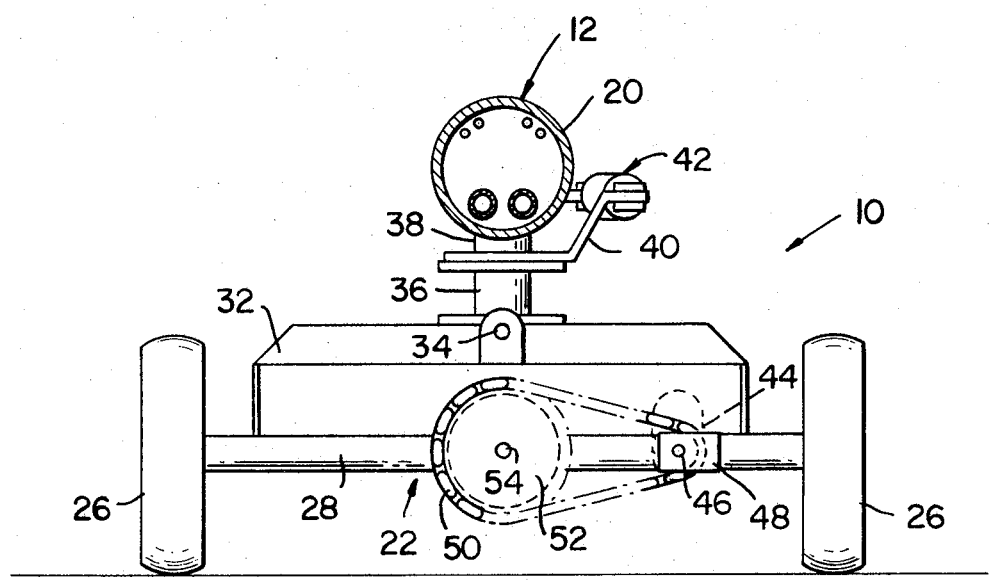
FIG_3
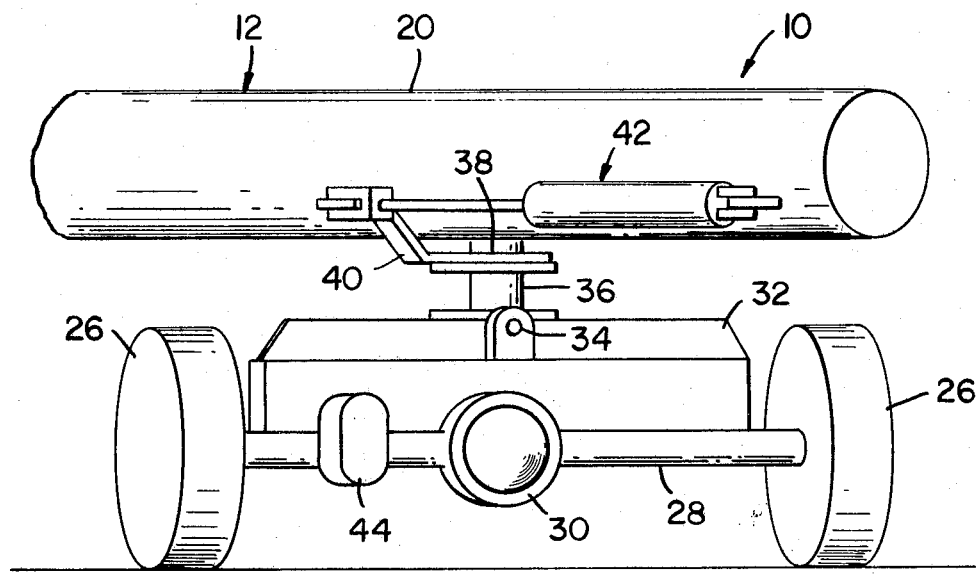
FIG_4
INVENTOR.
ALBERT V. VALENTE
BY
Townsend and Townsend
ATTORNEYS April 21, 1970     A. V. VALENTE     3,507,106
TREE CROP HARVESTER
Filed May 15, 1967     4 Sheets-Sheet 3
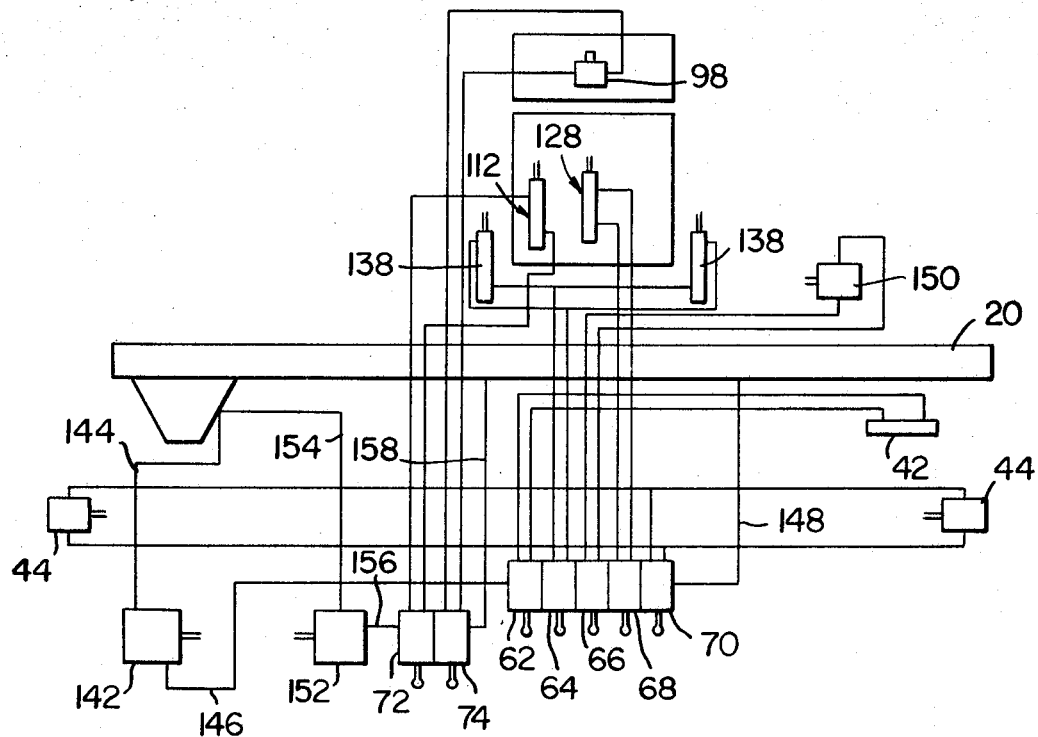
FIG_5
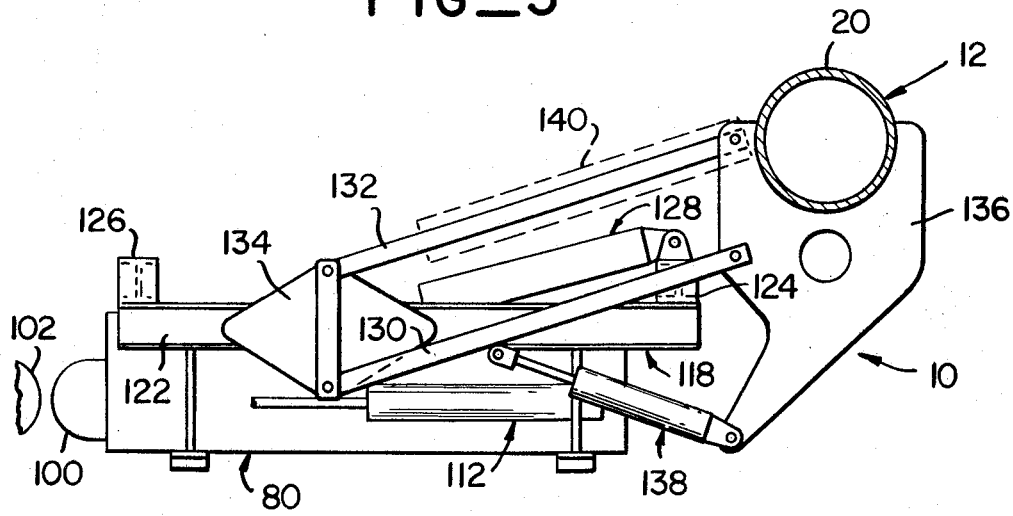
FIG_6
INVENTOR.
ALBERT V. VALENTE
BY
Townsend and Townsend
ATTORNEYS

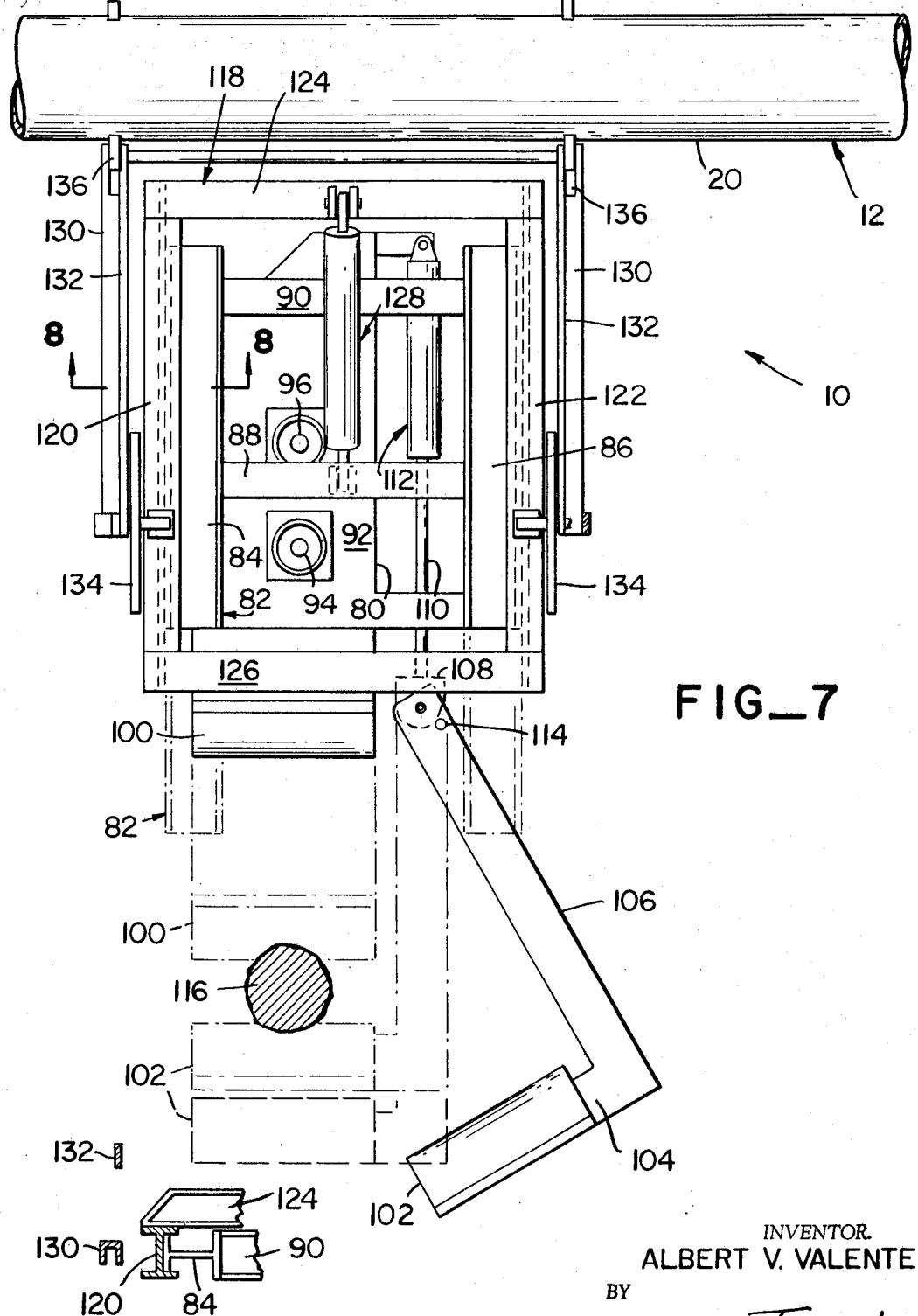

United States Patent Office 3,507,106
Patented Apr. 21, 1970

3,507,106
TREE CROP HARVESTER
Albert V. Valente, P.O. Box 187, Vina, Calif. 96092
Filed May 15, 1967, Ser. No. 638,368
Int. Cl. A01g *19/00*
U.S. Cl. 56—328   7 Claims

ABSTRACT OF THE DISCLOSURE

Tree crop harvesting apparatus comprising a self-propelled vehicle having a shaker assembly attached to one side thereof for shaking the trunk of a tree when the vehicle is disposed adjacent to the tree. Power is supplied to the various components of the apparatus by hydraulic circuitry and the vehicle body includes a closed tube providing a fluid reservoir for the circuitry. The vehicle is steerable and has an operator platform aligned with the shaker assembly, the latter being movable horizontally and vertically to permit positioning of the same at a desired location on a tree trunk.

---

This invention relates to improvements in tree crop harvesters and, more particularly, to an improved tree shaking machine.

The present invention is directed to the combination of a self-propelled vehicle having a tree shaking device on one side thereof which is movable into engagement with the trunk of a tree for shaking the latter to remove a crop, such as fruit or nuts growing on the tree. The crop, as it gravitates from the tree, can be collected, such as by the use of drapers or the like carried by the vehicle or otherwise positioned beneath the tree and above the ground.

Prior tree shaking machines have generally been of the type provided with boom-like limb shakers which engage individual tree limbs for shaking the same to remove the growing crop therefrom. This type of shaker requires considerable amount of time to shake an entire tree if the tree has a relatively large number of limbs to be shaken.

Machines for shaking the trunks of trees have been developed in the past to avoid the above-mentioned problem of the limb-type shakers. However, for the most part, the conventional trunk-type shaking machine is generally complex in construction and quite cumbersome to move and operate. Such machines usually require several workmen performing different, independent functions to complete the harvesting process and also require considerable maintenance to maintain them operable in view of the complexity of their structure. This type of machine generally does not have the desired degree of maneuverability nor does it allow a tree trunk to be engaged at the most desired location thereon to avoid destructive bark or other damage to the tree trunk.

The present invention provides a machine for shaking the trunk of a tree in a manner which circumvents the problems associated with tree shaking machines of conventional design. To this end, the invention provides a vehicle which is highly maneuverable to permit the accurate positioning of a tree shaking device carried by the vehicle adjacent to and in alignment with a tree trunk to be shaken. The vehicle and the shaking assembly are simple and rugged in construction and can be operated by a single workman. Thus, the machine is suitable for harvesting the crop of a number of trees in a minimum of time and with a minimum expenditure of time and effort on the part of a labor force.

The shaking assembly itself is shiftably mounted on the vehicle so that it can be moved horizontally toward and away from a tree to be shaken and can be raised and lowered relative to the tree whereby the most desired shaking location on the tree can be engaged by the assembly. The mounting for the shaking assembly can be constructed to permit tilting of the assembly, whereby tree trunks which are inclined can be shaken as well.

The vehicle itself provides the dual function of advancing the shaking assembly over the ground as well as to provide a fluid reservoir for the hydraulic power circuits coupled with the power components of the machine. To this end, the vehicle comprises a closed, rigid tube forming the main body portion of the vehicle and to which a pair of longitudinally spaced ground engaging wheel and axle assemblies are attached. The tube has sufficient rigidity to provide the main structural support for the various components attached thereto. Moreover, the relatively large surface area of the tube functions to radiate the heat from the hydraulic fluid received within the tube. Thus, the operation of the machine can continue uninterruptedly and no external cooling sources are required to minimize the heating content of the hydraulic fluid.

Another important feature of the invention is the use of a frame attached to the vehicle and on which the shaking assembly is shiftably mounted. During the operation, the shaking assembly is free to reciprocate through a limited distance relative to the frame, i.e., there is no rigid connection between the shaking assembly and the frame. Thus, the displacements of the shaker assembly due to its vibration are not transmitted as vibrations to the vehicle through the frame and thereby the components of the vehicle will not be subject to fatigue due to the vibration.

The tree shaking machine for this invention can use any one of a number of conventional shaking devices for the tree-engaging part of the shaking assembly. For purposes of illustration only, the machine will be described as having a conventional shaking device of the type having a first tree-engaging head section on a relatively fixed support and a second tree-engaging head section on a swingable arm, the head sections being adapted to engage opposite sides of a tree to be shaken.

It is the primary object of the present invention to provide an improved tree shaking machine of the type for engaging the trunk of a tree, wherein the machine is highly maneuverable, can be operated by a single workman, and can harvest the growing crop of a tree in a minimum of time and without damaging the tree in any way.

Another object of this invention is to provide a machine of the type described which is self-propelled and whose vehicle portion includes a closed tube forming fluid reservoir for the hydraulic power circuits of the various power components of the machine whereby the tube presents a relative large surface area for the radiation of heat from the hydraulic fluid received thereby to eliminate the need for additional fluid cooling means on the vehicle.

A further object of the invention is to provide a vehicle for a machine of the type described wherein the tubular body of the vehicle is used to support not only the shaker assembly but also an operator's platform in alignment with the shaker assembly whereby the operator positioned on the platform can not only drive the vehicle over the ground but can effectively operate the shaking assembly without changing position.

Another object of the invention is to provide a shaking assembly for a machine of the aforesaid character wherein shaking device of the assembly can be raised and lowered as well as moved horizontally toward and away from a tree to be shaken, so that the most desired shaking location on the tree trunk can be engaged to thereby minimize shaking time and avoid damage to the true trunk itself.

Another object of the present invention is to provide a shaker assembly for the above-mentioned machine wherein the shaking device of the assembly can be vibrationally isolated from the vehicle during a tree shaking operation to minimize or substantially eliminate fatigue of the components of the vehicle due to the vibration.

Other objects of this invention will become apparent as the following specification progresses, reference being had to the accompanying drawings for an illustration of a preferred embodiment of the tree shaking device.

In the drawings:

FIGURE 1 is a top view of the tree shaking machine with the shaking assembly shown schematically;

FIGURE 2 is a side elevational view of the machine;

FIGURE 3 is a cross sectional view, on an enlarged scale taken along line 3—3 of FIGURE 1;

FIGURE 4 is an enlarged perspective view of the front portion of the vehicle forming a part of the machine;

FIGURE 5 is a schematic view of the hydraulic circuitry of the machine;

FIGURE 6 is a side elevational view of the shaking assembly;

FIGURE 7 is a top plan view of the shaking assembly; and

FIGURE 8 is a cross sectional view taken along line 8—8 of FIGURE 7.

The preferred embodiment of the tree shaking machine of this invention is broadly denoted by the numeral 10 and includes a vehicle 12, a tree shaking assembly 14 and structure 16 for mounting assembly 14 on one side of vehicle 12 as shown in FIGS. 1, 6 and 7.

Machine 10 is adapted for movement into a position adjacent to a tree to be shaken, following which assembly 14 is moved into engagement with the tree for shaking the same. The machine can also include a draper 18 shown in dashed lines in FIG. 1 for collecting or cushioning the fall of the crop from the tree as the latter is shaken. Other draper structure could be used on vehicle 10 or beneath the tree to be shaken so that substantially all of the crop shaken from the tree will be collected and directed to a receiving station.

Vehicle 12 includes a closed tube 20 having front and rear wheel and axle assemblies 22 and 24 thereon for supporting tube 20 for movement over the ground. Each of the assemblies 22 and 24 has a pair of ground engaging wheels 26 secured at the ends of an axle 28 provided with a differential gear unit 30 between the wheels (FIG. 4).

Front assembly 22 is steerable so that vehicle 12 can be maneuvered as it moves over the ground. To this end, axle 28 of assembly 22 has a longitudinally extending mounting beam 32 extending upwardly from the axle (FIGS. 3 and 4) and is pivotally secured by a pin 34 to the lower end of a vertical shaft 36 rotably mounted on and axially aligned with the lower end of a second shaft 38 secured to and extending downwardly from tube 20. Pin 34 allows axle 28 of assembly 22 to rock about the axis of pin 34 relative to shaft 36 so that shafts 36 and 38 will remain substantially vertical when the front wheels move over bumps or into ruts in the path of the vehicle. To rotate shaft 36 relative to shaft 38, an arm 40 is secured to the upper end of shaft 36 and extends laterally therefrom. The outer end of arm 40 is pivotally attached to one end of a piston and cylinder assembly 42 (FIG. 4). The opposite end of assembly 42 is coupled to the forward end of tube 20. This construction allows vehicle 12 to be steered as it moves over the ground by actuating assembly 42 from a control position hereinafter described. Assembly 42 is coupled to a source of fluid under pressure and is selectively actuated by the operator of the vhicle in a manner to be described. The fluid lines leading to and from assembly 42 and leading to and from other power components of machine 10 hereinafter set forth are not shown, such lines being shown schematically in FIG. 5 which illustrates the hydraulic circuitry of machine 10 and which is to be described.

Assembly 22 further includes a hydraulic motor 44 carried in any suitable manner, such as by axle 28 (FIG. 4). Motor 44 is provided with a drive shaft 46 (FIG. 3) which extends rearwardly and whose outer end is mounted by means of a bearing 48 and rearwardly spaced relationship to axle 28. Shaft 46 has a sprocket (not shown) thereon coupled with an endless link chain 50 which, in turn, is coupled to a larger sprocket 52 carried by a shaft 54 coupled to the gears of differential gear unit 30. The gears of unit 30, in turn, operate to rotate wheels 26 of assembly 22 either forwardly or rearwardly, it being clear that motor 44 is of the reversible type. In this way, vehicle 12 may be moved forwardly or in reverse over the ground and in view of the steerability of assembly 22, the vehicle can be easily maneuvered by an operator controlling both assembly 42 and motor 44.

Rear wheel and axle assembly 24 includes a receptacle having a pair of generally triangular sides 56 which are secured to and extend outwardly and downwardly from opposed sides of tube 20 adjacent to the rear end thereof. This receptacle also has a flat bottom interconnecting the outer ends of sides 56. The purpose of the receptacle is twofold: it provides a support for the rear axle 28 and it communicates with tube 20 to provide a sump therefor. Thus, the pump means of the hydraulic circuitry to be described is attached to the receptacle to draw fluid therefrom. If desired, the receptacle can be provided with a removable fluid filter (not shown) to filter the fluid flowing therefrom.

If desired, assembly 24 may include a hydraulic motor similar in all respects to motor 44 which drives the differential unit of the rear axle 28 in the manner described above with respect to front assembly 22 (FIGS. 3 and 4). In this way, the vehicle may have front and rear wheel drives for increased power.

Vehicle 12 has a first platform 58 for supporting the vehicle operator on one side of tube 20 (FIGS. 1 and 2). Platform 58 also supports the control structure broadly denoted by the numeral 60 for the various hydraulic power circuits of machine 10, structure 60 including a first bank of fluid valves 62, 64, 66, 68 and 70. Structure 60 also includes a second bank of fluid valves 72 and 74, the connections to valves 62–74 being shown schematically in FIG. 5 and hereinafter described. Platform 58 is in horizontal alignment with assembly 14 and mounting structure 16 as shown in FIG. 1. Thus, the operator will at all times be in a position to observe the shaking action of assembly 14 as well as the way in which mounting structure 16 moves assembly 14 into and out of engagement with a tree to be shaken. Thus, the shaking assembly can be moved into and out of contact with the tree in a manner to guard against any damage to the tree itself.

A second platform 76 is secured to one side of tube 20 rearwardly of platform 58 (FIGS. 1 and 2). Platform 76 supports the self-contained power source 78 which, for purposes of illustration, comprises a gasoline engine of conventional construction. Power source 78 will be described with respect to FIG. 5 as being coupled to the pump means of the hydraulic circuitry of machine 10 to actuate such pump means to in turn pressurize the various hydraulic power circuits necessary to carry out the functions of the machine. While such pump means is not shown in FIGS. 1 and 2, it is clear it could be supported by either platform 58 or platform 76. Similarly, the fluid connections between the components on the two platforms are omitted in FIGS. 1 and 2 to clarify the structure of the machine in this area.

Shaking assembly 14 includes a shaking device 80 (FIG. 7) carried by a first, generally rectangular frame 82 having a pair of opposed sides 84 and 86 and interconnected by a pair of cross pieces 88 and 90. While device 80 can be any one of a number of different conventional types, it will be described hereinafter as being of the conventional type having a housing 92 for a pair of rotatable, eccentrically mounted weights (not shown) mounted on generally vertical shafts 94 and 96 respectively. Shafts 94 and 96 are rotated in any suitable manner, such as by a hydraulic motor 98 (FIG. 5) so that, when motor 98 is actuated, the eccentric weights rotate about the axes of shafts 94 and 96 to impart a vibratory displacement to a pair of shaker head sections 100 and 102. Head sections 100 and 102 are usually formed of a cushioning material such as a mass of sand within a tubular housing of rubber or the like. The purpose of this construction is to minimize or substantially eliminate any damage that might be caused to a tree trunk when head sections 100 and 102 move into engagement with the opposite sides of the tree.

Head section 100 is secured to the outer end of housing 92 and head section 102 is connected to the inner side of a lateral extension 104 on the outer end of a beam 106 pivotally carried by structure 108 on the outer end of the extensible piston rod 110 of a fluid piston and clyinder assembly 112 (FIG. 7). The inner end of assembly 112 is pivotally secured to the inner end of housing 92. Structure 108 is constructed to permit arm 106 to move outwardly of the vehicle when assembly 112 is initially actuated and until structure 108 strikes a stop (not shown) adjacent to the outer end of housing 92. Further actuation of assembly 112 causes arm 106 to pivot about the pin 114 interconnecting structure 108 and arm 106. FIG. 7 shows arm 106 pivoted through an angle permitting head section 102 to be moved on the opposite side of a tree 116 from head section 100.

Frame 82 is shiftably mounted on a second frame 118 having a pair of sides 120 and 122 interconnected by a pair of spaced cross pieces 124 and 126. For purposes of illustration, each of the sides 120 and 122 comprises an I-beam and each of the sides 84 and 86 also comprises an I-beam. Side 84 is shiftably mounted in side 120 in the manner shown in FIG. 8 whereby the innermost portion of side 120 provides a track for side 84 for guiding the latter as the same moves laterally of vehicle 12 and in the plane of frame 118. In this manner, device 80 is caused to shift toward and away from tube 20 and thereby carries head sections 100 and 102 therewith.

A fluid piston and cylinder assembly 128 is pivotally coupled at one end to cross piece 124 (FIG. 7) and at the opposite end to cross piece 88. When assembly 128 is actuated, frame 82 is caused to shift outwardly of frame 118 to thereby cause head section 100 to move into engagement with tree 116. The dashed lines in FIG. 7 illustrate the operative positions of head sections 100 and 102 at various stages during the movement of the device 80 into engagement with a tree to be shaken.

Frame 118 is coupled for up and down movement on tube 20 by two sets of parallel arms on opposed sides of the frames. Each set of arms includes a lower arm 130 and an upper arm 132 pivotally secured to a diamond shaped plate 134 rigid to the corresponding side of the frame and also pivotally secured to a support plate 136 rigid to and extending downward from tube 20 (FIG. 6). The parallel arm arrangement defines a parallelogram mounting means which assures that the operating attitude of frame 118 and thereby device 80 will be maintained as the frame is moved up and down. To move the frame up and down relative to tube 20, a pair of fluid piston and cylinder assemblies 138 are pivotally coupled to the lower ends of respective plates 136 and to the undersides of arms 130 (FIG. 6).

Arms 132 on opposed sides of frame 118 can be replaced by a fluid piston and cylinder assembly denoted by the number 140 and shown in dashed lines in FIG. 6. With this construction, the effective arms at the upper ends of the parallelograms are extensible to allow for tilting of device 80 with respect to the ground. Thus, head sections 100 and 102 can still engage a tree even though the tree trunk of the tree is inclined Additional hydraulic circuitry will be used if assemblies 140 are employed.

The hydraulic circuitry of machine 10 is shown in FIG. 5 and utilizes the interior of tube 20 as a fluid reservoir for the entire circuitry. Since the tube is relatively long, it presents a relatively large surface area for cooling the hydraulic fluid received thereby. In this way, no additional cooling means is necessary for the machine and the tube serves the dual function of providing a backbone for the vehicle as well as a reservoir for the circuitry.

The circuitry includes a first fluid pump 142 coupled in any suitable manner to power source 78. The input to pump 142 is coupled by a fluid line 144 from above-mentioned fluid sump. The output of pump 142 is coupled by a fluid line 146 to the valve bank including valves 62–70. The fluid line 148 connects the valve bank to tube 20.

Valves 62–70 are of the two-way type and are operated by suitable control by handles accessible to the vehicle operator positioned on platform 58. Valve 62 is coupled by fluid pressure and return lines to assembly 42 for steering vehicle 12. Valve 64 is coupled by pressure and return lines to assemblies 138 for raising and lowering frame 118. Valve 66 is coupled by pressure and return lines to a hydraulic motor 150 for powering a draper. Valve 68 is connected by pressure and return lines to assembly 128 for shifting device 80 toward and away from a tree to be shaken. Valve 70 is coupled by pressure and return lines to front and rear hydraulic motors 44 for drawing the vehicle over the ground.

A second fluid pump 152 is coupled in any suitable manner to power source 78 and is used with hydraulic motor 98 and assembly 112. The purpose of this is to assure pressurized fluid to these components at all times. However, it will be appreciated that these latter two components can also be operated from the valve bank controlled by pump 142.

A fluid line 154 couples the input of pump 152 to reservoir or tube 20. A fluid line 156 couples the output of pump 152 to the second valve bank containing valves 72 and 74. A return fluid line 158 couples the valve bank to tube 20.

Valve 72 is coupled by pressure and return lines to assembly 112 whereby the position of arm 106 is controlled. Valve 74 is coupled by pressure and return lines to motor 98 whereby the eccentric weights coupled to shafts 94 and 96 of device 80 are caused to rotate and thereby impart a shaking force to a tree 116 when head sections 100 and 102 engage the tree in the manner shown in dashed lines in FIG. 7.

If assemblies 140 are utilized in the parallelogram mounting means described above, an additional valve will be provided in the first-mentioned valve bank for controlling the fluid flow to and from the assemblies 140. Thus, the shaking device can be tilted with respect to the vertical for trees which are inclined relative to the ground.

OPERATION

Device 80 is initially retracted to the full line position of FIG. 7 before machine 10 is moved into operation adjacent to a tree to be shaken. Also, arm 106 is retracted to the position with its head section 102 adjacent to head section 100. The various valves of the hydraulic circuitry initially are in their neutral positions and this allows fluid flow from the pumps 142 and 152 through the respective valve banks, to and through tube 20, and finally again to the pumps. This will assume, of course, that power source 78 is in operation.

The operator positioned on platform 58 then manipulates valve 70 to actuate hydraulic motors 44 which, in turn, advance vehicle 12 in a forward direction. The vehicle is moved until it becomes laterally aligned with a tree to be shaken, whereupon the vehicle is brought to a halt and to this end, suitable brake structure can be utilized, if desired.

During the movement of the vehicle over the ground, valve 62 may be manipulated in order to effect steering of the vehicle. Thus, right and left-hand turns can be made and the vehicle can be moved in reverse if necessary.

As the vehicle begins to move, valve 72 is manipulated to cause arm 106 to move outwardly of the vehicle and to swing to a position with arm 106 extending substantially longitudinally of tube 102. Thus, head section 102 is in a position to be moved onto one side of a tree to be shaken when head section 100 is aligned with the opposite side of the tree. Moreover, the movement of arm 106 in this manner assures that it will not be interfered with by a tree after the vehicle has come to a halt in the proper position for shaking the tree.

Assuming that the vehicle has come to a halt with section 100 aligned with one side of the tree to be shaken, valve 72 is manipulated in the opposite direction to cause arm 106 to swing to the dashed line position of FIG. 7 wherein head section 102 is on one side of the tree. Then, valve 68 can be manipulated to actuate assembly 128 to cause frame 82 and thereby device 80 to be shifted outwardly of the vehicles until head section 100 engages the proximal side of the tree. During this time, head section 102 can be brought into engagement with the tree also by the proper manipulation of valve 72. Finally, both head sections 100 and 102 will engage the tree and will then be ready to shake the latter.

Valve 74 will then be manipulated to actuate motor 98, whereupon the shaking action will commence and head sections 100 and 102 will exert a shaking force to the tree caused by the rotation of the eccentrics coupled with shafts 94 and 96. The shaking force will cause the crop growing on the tree to fall therefrom and, assuming the proper positioning of drapers or other collectors below the tree, the crop can be collected and directed to a receiving station.

Before valve 74 is manipulated to actuate motor 98, valve 68 is manipulated into a second operative position wherein it disconnects assembly 128 from the main fluid flow line from pump 142 and interconnects the ends of the cylinder of assembly 128 while fluid remains in both sides of the cylinder. Thus, movement of the piston within the cylinder will force fluid out of one end of the cylinder and into the opposite end. Reverse movement of the piston will reverse this flow. In this manner, assembly 128 will be "floating" and will allow frame 82 and thereby device 80 to reciprocate relative to frame 118. The end result is that substantially no vibration is imparted to frame 118 and thereby to vehicle 12 since there is no rigid connection between frame 82 and frame 118. Thus, the components of the mounting means and the vehicle will not be subject to fatigue due to such vibration. When valve 68 is in float position it concurrently acts to deactuate valve 70 and thereby prevents accidental forward or reverse movement of the vehicle 12 while tree shaking device is operating.

It is to be noted that all of the aforesaid functions of machine 10 can be carried out by a single operator positioned on platform 58 and manipulating the various valves of the valve banks. Accurate positioning of the vehicle and the shaking assembly can be assured since the operator has an unobstructed view forwardly and rearwardly of the vehicle as well as to the side and in the direction of the shaking assembly itself.

When it is desired to end the shaking of a tree, valve 74 is manipulated to deactuate motor 98 and valve 71 is manipulated to force head section 102 away from the tree. Also, valve 68 is moved into its first-mentioned operative position wherein device 80 is retracted and head section 100 is moved away from the tree. Continued manipulation of valve 72 will cause arm 106 to again swing to a position extending longitudinally of tube 20, whereupon the operator can then manipulate valve 70 to advance vehicle 12 to another tree to be shaken. The above-mentioned procedure is again repeated for the second tree and for as many trees as are to be shaken by the machine.

Machine 10 provides a self-propelled tree shaking apparatus of simple and rugged construction and one which can be easily and readily operated by only a single individual. By proper manipualtion of the various valves, the operator can position the shaking device for substantially any tree to be shaken, including trees which are inclined with respect to the ground.

While one embodiment of this invention has been shown and described, it will be apparent that other adaptations and modifications can be made without departing from the true spirit and scope of the invention.

What is claimed is:

1. Tree shaking apparatus comprising: a vehicle having a closed tube and a pair of wheel and axle assemblies secured to the tube at longitudinally spaced locations thereon for supporting the tube for movement over the ground, one of said assemblies being steerable, self-contained drive means carried by the tube for driving one of said assemblies, whereby the vehicle is movable over the ground; first power means coupled with said one assembly for steering the same; a frame; means at one side of said tube for mounting said frame in a generally horizontal position and for up and down movement relative to the tube with the frame extending laterally from the tube; second power means coupled with the frame for raising and lowering the same; an actuable tree-engaging shaking device shiftably mounted on said frame and movable relative thereto toward and away from said tube, whereby the device may move into and out of engagement with a tree to be shaken when the frame is horizontally aligned therewith; third power means carried by said frame and coupled with said device for shifting the latter relative to said frame; fourth power means carried by said vehicle for actuating said device; a platform secured to said tube; and means carried by said platform for controlling said drive means, said first power means, said second power means, said third power means and said fourth power means independently of each other.

2. Tree shaking apparatus as set forth in claim 1, wherein said frame mounting means includes arm means defining a parallelogram structure, whereby the frame remains substantially horizontal as it is raised and lowered.

3. Tree shaking apparatus as set forth in claim 2, wherein said arm means includes a pair of arms on each side of the frame respectively, one of the arms of each pair being extensible, whereby the frame and thereby said device can be tilted with respect to said tube.

4. Tree shaking apparatus as set forth in claim 1, wherein said drive means, said first power means, said second power means, said third power means, and said fourth power means comprise first, second, third, fourth and fifth hydraulic circuits respectively, said tube communicating with each circuit and providing a fluid reservoir common to all of said circuits.

5. A tree shaking machine comprising: a support; an actuatable tree shaking device; a first frame having means defining a pair of spaced tracks, said device having a second frame provided with a pair of sides shiftably coupled with respective tracks of the first frame for mounting said device on said support for movement relative thereto into and out of engagement with the trunk of a tree to be shaken; first power means coupled to said device for moving the same relative to said support; and second power means coupled to the device for actuating the same after it has engaged a tree trunk, whereby the device will exert a shaking force on said tree trunk.

6. A tree shaking machine as set forth in claim 5, wherein said first power means comprises a piston and cylinder assembly interconnecting said frame and a hydraulic circuit having a fluid valve, said valve having a first operative position permitting fluid flow to and from said assembly and a second operative position interconnecting the ends of the cylinder of said assembly, whereby the second frame is free to move through a limited distance relative to said first frame to thereby cause the vibrational displacements of said device to be neutralized.

7. A tree shaking machine comprising: a closed tube having longitudinally spaced, ground-engaging wheel and axle assemblies thereon; an actuatable tree shaking device; means mounting said device on said support for movement relative thereto into and out of engagement with the trunk of a tree to be shaken; first power means coupled to said device and including a first hydraulic circuit for moving the same relative to said support; and second power means coupled to the device and including a second hydraulic circuit for actuating the same after it has engaged a tree trunk, whereby the device will exert a shaking force on said tree trunk, said tube communicating with each circuit and defining a fluid reservoir therefor.

References Cited

UNITED STATES PATENTS

| | | | |
|---|---|---|---|
| 2,690,639 | 10/1954 | Goodwin | 56—328 |
| 3,163,458 | 12/1964 | Brandt | 56—328 X |
| 3,406,508 | 10/1968 | Fridley | 56—328 |

RUSSELL R. KINSEY, Primary Examiner